Figure 1:
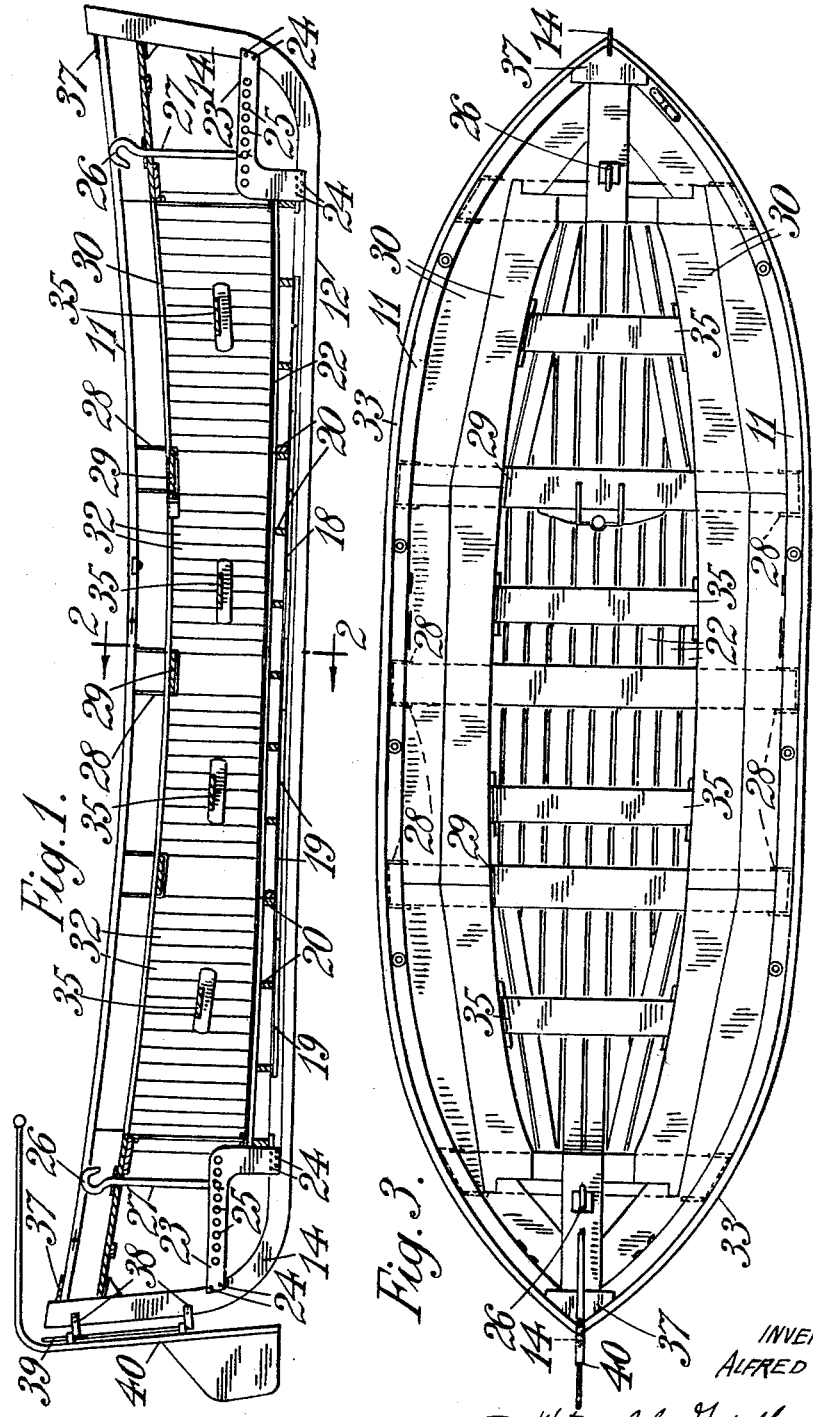

Dec. 25, 1962  A. G. W. HALL  3,069,703
HULLS OF BOATS FORMED FROM SYNTHETIC-RESIN-BONDED GLASS FIBRE
Filed April 21, 1955  3 Sheets-Sheet 1

INVENTOR
ALFRED G.W. HALL
By Watson, Cole, Grindle & Watson
ATTORNEYS

Dec. 25, 1962 A. G. W. HALL 3,069,703
HULLS OF BOATS FORMED FROM SYNTHETIC-RESIN-BONDED GLASS FIBRE
Filed April 21, 1955 3 Sheets-Sheet 2

INVENTOR
ALFRED G. W. HALL
By Watson, Cole, Grindle & Watson
ATTORNEYS

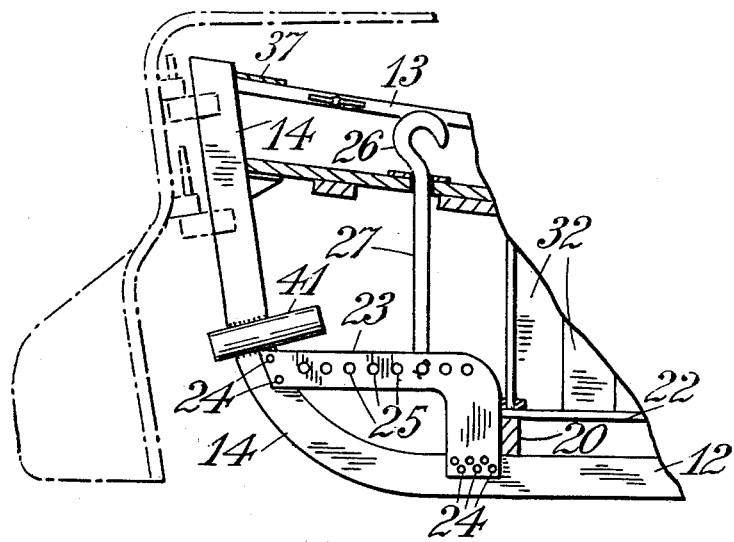

United States Patent Office 3,069,703
Patented Dec. 25, 1962

3,069,703
HULLS OF BOATS FORMED FROM SYNTHETIC-RESIN-BONDED GLASS FIBRE
Alfred George William Hall, East Molesey, England, assignor to Watercraft Limited, East Molesey, England, a British company
Filed Apr. 21, 1955, Ser. No. 502,901
Claims priority, application Great Britain Apr. 22, 1954
3 Claims. (Cl. 9—6)

This invention relates to hulls of boats formed from synthetic-resin-bonded glass fibre and has for an object to simplify the manufacture of such boats.

It is already known to form the hull of such boats in a single mould and the method has consisted in applying to the mould (with or without having first coated it with a separating layer) one or more coatings of a synthetic resin, for example a polyester resin or phenolic resin in a fluid condition i.e. in an unset or uncured or partly set or partly cured condition the exposed coating being arranged to be slow setting or curing so as to give sufficient time for the reset operation to be carried out before the completion of setting or curing then laying a layer of glass fibres on the synthetic resin before it gels and applying pressure to it as by a roller, so as to cause the synthetic resin to impregnate the glass fibres, then applying a further slow setting or curing coating of synthetic resin and another layer of glass fibres, and consolidating it by rolling and repeating the process until the required thickness is built up. The setting or curing of the synthetic resin may be effected by including in the resin a suitable catalyst with or without an accelerator so that the setting takes place after a predetermined interval of time with or without the application of heat and pressure. For example in the case of a polyester resin which is required to set or be cured without the application of heat there may be included in the resin a proprietary catalyst known as M.E.K. peroxide and an accelerator in the form of cobalt naphthanate. In the case where setting or curing of the polyester resin is effected by the application of heat and pressure there may be included in the resin a catalyst known as benzoyl peroxide. For example, for applying pressure there may be secured to the mould in an air tight manner a flexible sheet which extends over the coated surface of the mould and subjecting the inner surface of the sheet to vacuum so that it is drawn against the coated surface thereby applying pressure or subjecting the outer surface to pressure whereafter the assemblage is heated for example by radiant heat lamps.

One disadvantage of moulding the hull in one piece in a single mould is that it does not permit projections on the hull to be formed since it may not be possible to separate the finally formed hull from the mould. For example, where a hull requires to be provided with an inwardly extending gunwale, this has usually required to be attached after the moulding operation has taken place. A further object of the invention is to overcome such difficulties.

According to this invention a boat hull formed from synthetic-resin-bonded glass fibres is characterised in that the hull is formed in a number of parts secured together on either side of a vertical central plane extending from stem to stern.

Preferably for small boats the hull is formed in two halves secured together on either side of a vertical central plane.

In such an arrangement, the inwardly directed gunwales are formed integrally with the upper edge of each hull half, since it will be appreciated that by forming the hull in two separate halves the half hull may be more readily manipulated out of a one piece mould, although if necessary the part of the mould in which the gunwale is formed may be detachable from the main part of the mould. The gunwales may be of channel section.

An important feature of the invention consists in that the two halves of the hull are secured one on either side of the keel plate.

Preferably the keel plate extends along the whole length of the opposed edges of the two halves of the hull.

The keel plate may be formed from metal. The plate may be so shaped as to provide a bulb keel, thus protecting the outer surface of the hull from abrasion when being drawn over a beach or the like.

The inner extremities of the two halves of the hull may be flanged so that the faces of the flanges extend parallel with one another and are arranged to abut flat against opposite sides of the keel plate.

The two halves of the hull may be so clamped on either side of the keel plate that the latter extends both above and below the hull, at least along the bottom of the boat.

Figure 2:
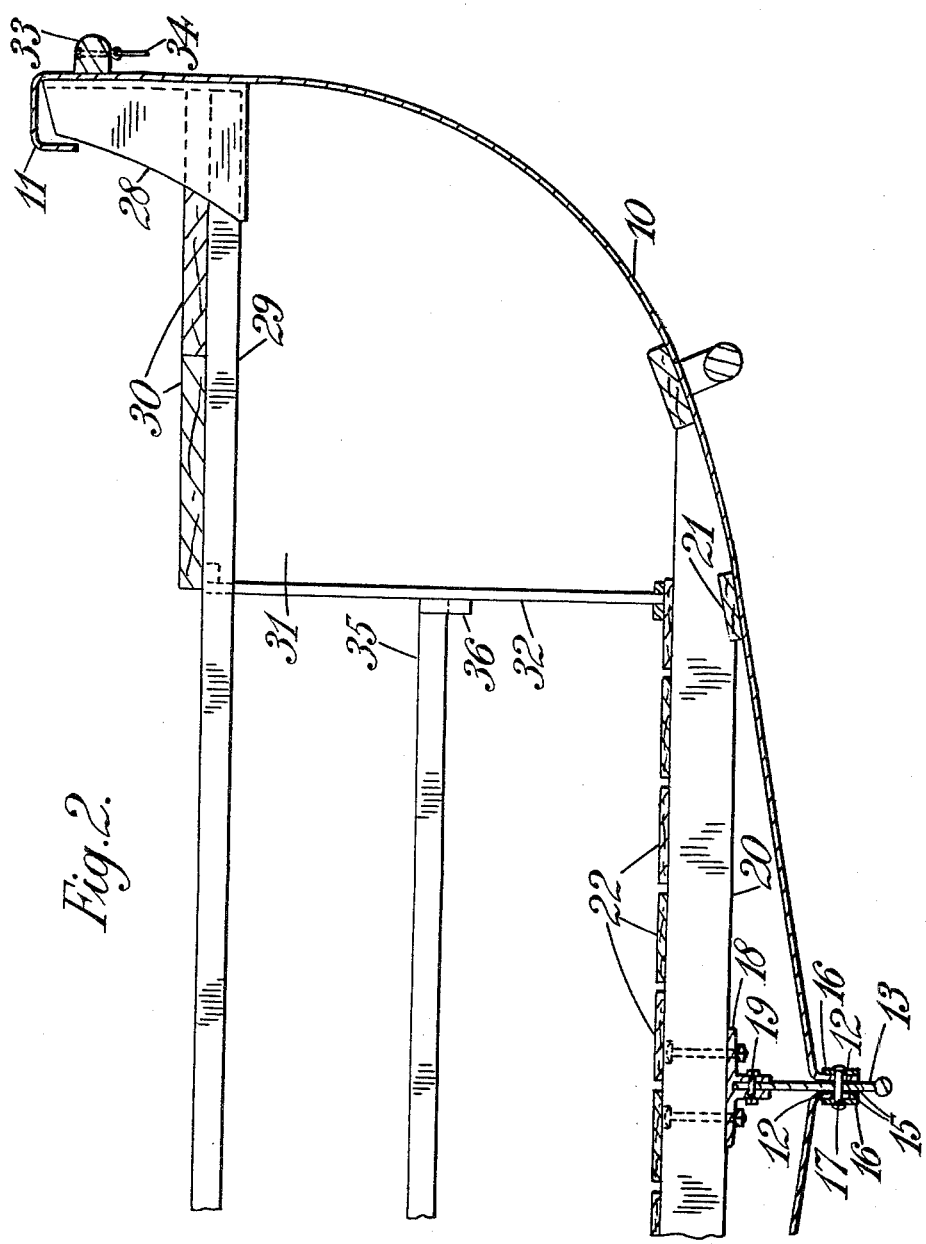

Other features of the invention are set out in the following description and claims reference being made to the accompanying drawing in which:

FIGURE 1 is a vertical longitudinal section through the finished boat and showing one half hull, FIGURE 2 is a cross section on the line 2—2 of FIGURE 1, FIGURE 3 is a plan view of the finished boat, and FIGURE 4 is an elevation of the stern end of a half hull showing a propeller shaft bearing fitting.

As best seen in FIGURE 2 each hull half comprises a shell 10 moulded from synthetic-resin-bonded glass-fibre in the manner set out earlier which shell is formed along its upper edge with an inverted channel shaped gunwale 11 and along its lower edge with a downturned flange 12. The downturned flanges of the two hull halves are disposed on either side of a metal bulb keel 13 which is arranged to extend both above and below said flanges. As best seen in FIGURE 1 the ends of the keel are curved upwardly at 14 so as to project a short distance above the top of the gunwale. Each hull half and the keel are symmetrical about a vertical central transverse plane. Strips 15 of plastic are arranged between the flanges and the keel along the whole length thereof and reinforcing strips 16 of metal are similarly arranged along the outside of flanges 12 which strips may be formed from a light alloy such as an aluminium alloy. Light alloy rivets 17 ⅜ inch in diameter are arranged to extend through strips, flanges, sealing strips and keel so as to clamp these parts together along the whole length of the keel. A keelson 18 having a slotted flange on the underside thereof is secured by rivets 19 along the top part of the keel and supports cross bearers 20 which are formed with recesses on their undersides near their extremities to receive longitudinal members 21 which rest loosely on the inner face of the shell. Floorboards 22 extend across the upper edges of the bearer.

Instead of the loose floor structure above referred to, cross members formed from synthetic resin bonded glass fibre may be bonded to the inner surface of the hull which cross members may support floor boards. These cross members may be so shaped as to provide gaps across which the upwardly projecting keel plate extends.

Angular metal cleat plates 23 are arranged on either side of each keel plate and extend across the curved part 14 and are secured in position by rivets 24. The cleat plates are provided with a series of holes 25 and a bolt 27 may be arranged to extend through any pair of riveting holes and may be engaged by one end of a lifting hook 26. Thus excessive local stresses in the synthetic resin bonded glass fibre are avoided when the boat is lifted.

Angle plates 28 of channel formation having one end of the channel closed are moulded from synthetic resin bonded glass fibre and are bonded to the inner face of the shell adjacent the gunwale as best seen in FIGURE 2. The closed ends of these angle channel section angle plates serve to support wood thwarts 29 which extend from one hull half to the other hull half and these thwarts support side benches 30. Buoyancy tanks may be arranged beneath the side stretches and enclosed by walls 32 and extending from the benches down to the floor boards. A wood rubbing piece 33 may be secured along each side of the hull so as to extend across thte angle plates 28 to which it may be secured by suitable bolts or rivets and which rubbing piece has secured to it rings 34 for grip ropes.

Additional thwarts 35 may be supported by chocks 36 on said side walls 32. A plate 37 may be arranged to extend across the tops of the channels where they meet one another at each end of the boat, which plate is provided with a downwardly extending flange which extends between the gunwales, and the plate is slotted so as to permit the keel plate to extend through it.

Bearings 38 are secured to one of the curved extensions 14 of the keel for supporting a hinge pin 39 for a rudder 40.

In the case where a boat is provided with a motor driven propeller shaft, one curved portion 14 at the end of the keel may be formed in two parts which are welded above and below a propeller shaft bearing tube 41 so as to enable the engine to be centrally disposed.

In the case where the bearing tube is of greater diameter than the thickness of the keel plate, the flange on each half shell is formed with recesses during the moulding operation so as to accommodate the bearings.

In the case where each hull half is identical each is formed with two recesses at opposite ends and the registering recesses at the end of the hull further from the engine is closed by a suitable plug. As will be seen, the bearing tube 41 is disposed above the lifting cleats 33. In the case where the two hull halves are identical, only one mould is required and the synthetic resin bonded fibre glass is applied to the mould in the manner first referred to above.

I claim:

1. A boat hull comprising a rigid metal keel plate extending in one piece from stem to stern of the boat, hull sections arranged on opposite sides of said keel plate also extending each in one piece from stem to stern, which hull sections are so fashioned from resin bonded glass fibres as to be formed with integral downwardly directed flanges which extend along opposite sides of the keel plate, metal plates, each extending in one piece along the outer face of each flange, clamping bolts extending through holes in the metal plates, flanges and keel plate and which hull sections are also so formed as to provide inwardly directed integral gunwales of inverted channel section extending in one piece from one end of the boat to the other.

2. A boat hull according to claim 1 wherein the keel plate projects upwardly above the resin-bonded glass fibre bottom of the boat and wherein cross members formed separately from the hull sections have their ends supported by said sections whereas their center portions are supported by the upper edge of the keel plate without intervening resin-bonded glass fibres and wherein floor boards are supported by the cross members.

3. A boat hull according to claim 1 wherein seats extend along each hull section and are supported by angle section brackets which extend up into the channel section gunwale and are bonded to the upper face of the hull section.

References Cited in the file of this patent

UNITED STATES PATENTS

| | | |
|---|---|---|
| 644,723 | Ray | Mar. 6, 1900 |
| 753,425 | Noel | Mar. 1, 1904 |
| 1,667,561 | Mediavilla | Apr. 24, 1928 |
| 2,721,341 | Roberts et al. | Oct. 25, 1955 |

FOREIGN PATENTS

| | | |
|---|---|---|
| 698,967 | Great Britain | Oct. 28, 1953 |
| 913,774 | France | Sept. 19, 1946 |

OTHER REFERENCES

Modern Plastics, vol. 30, No. 3, November 1952, pp. 102–106, 125, 126, 128 and 130.

Scientific American, vol. 176, No. 5, May 1947, page 222.

Modern Plastics, vol. 27, No. 1, September 1949, pp. 103–107, inclusive.